Jan. 28, 1964 A. McNEILL 3,119,161
CUFF LINK
Filed July 19, 1961

INVENTOR.
ANGUS McNEILL
BY
R. E. Geangue
ATTORNEY 3,119,161
CUFF LINK
Angus McNeill, 11724½ Riverside Drive,
North Hollywood, Calif.
Filed July 19, 1961, Ser. No. 125,121
2 Claims. (Cl. 24—100)

This invention relates to a cuff link or the like, and more particularly to novel and improved attaching means for a cuff link employing a spring restored, sliding locking bar.

Shift cuffs are commonly made which require a link or stud to fasten the layers of fabric, comprising the cuff, together, in lieu of a cuff-attached button. To facilitate attaching or removing the cuff link, there is usually provided a mechanical fastening means, as an integral part of the cuff link. While there have been developed, heretofore, a number of such fastening means for cuff links, these have generally been directed to the pivotal locking bar type incorporating a detent mechanism which would hold the locking bar portion of the cuff link in a fixed position after insertion through the cuff. Notwithstanding the fact that these detent mechanisms have been designed to facilitate the insertion of the cuff link through the receiving openings in the cuff, in many instances these devices actually deter the insertion or removal of the link. To overcome the difficulty of inserting and removing the cuff link, it has been proposed heretofore to employ a locking bar having a pair of spring-biased telescoping elements which could be compressed, thereby reducing the overall length of the locking bar to facilitate insertion through the receiving openings of a shirt cuff or the like. This structure, while representing an improvement over the prior art, is unduly complicated as to manufacture and requires a considerable degree of dexterity in order to maintain the two telescoping members in the compressed condition during insertion through the cuff. To overcome the difficulties encountered in prior devices, there is contemplated by the present invention means by which a cuff link may be easily and quickly inserted or removed from a cuff regardless of the stiffness or thickness of the fabric material. In particular, there is provided by the present invention a fastening mechanism which aids and facilitates the insertion or removal of a cuff link from a cuff. Accordingly, the present invention employs a novel and improved slidable locking bar element, rather than a telescoping mechanism, and thus overcomes the complexity of manufacture and other shortcomings of prior devices and also provides a mechanism which may be easily operated with a minimum of manual dexterity.

It is therefore an object of the invention to provide a fastening mechanism for a cuff link or the like which is simple and inexpensive to manufacture and which is unusually simple to attach or remove from a cuff or the like.

Another object of the invention is to provide a novel and improved slidable locking bar for a cuff link or the like.

Still another object is the improvement of cuff links generally.

These and other objects of the invention will be more readily understood from the following detailed description, taken in conjunction with the drawings, in which.

Figure 1:
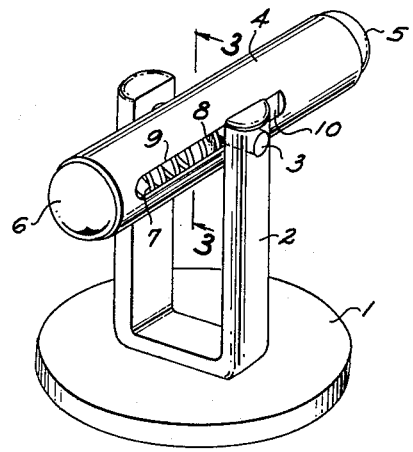
FIGURE 1 is a perspective view of a preferred embodiment of the invention.
Figure 3:
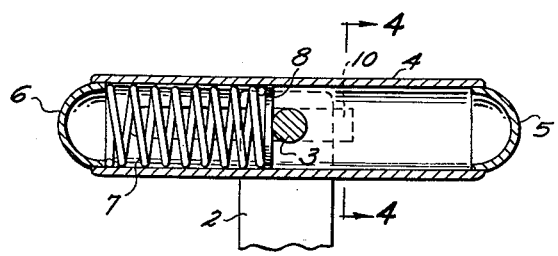
FIGURE 3 is a longitudinal section view of the locking bar portion of the apparatus of FIGURE 1.
Figure 4:
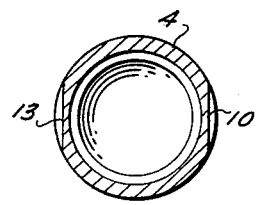
FIGURE 4 is a transverse cross section of the apparatus of FIGURE 3.

Looking now at FIGURE 1, there is shown a preferred embodiment of a cuff link according to the present invention. The cuff link comprises a base plate 1 which may be in the form of a button, a disc, an escutcheon or the like and may carry ornamentation on the obverse side as will be obvious to those skilled in the art. Stanchion or stud 2 is fixedly secured to base plate 1 by any suitable attaching means, as for example by spot welding. In the embodiment shown, stud 2 is substantially perpendicular to base plate 1; however, it should be understood that stud 2 may be raked or inclined from base plate 1 if desired. The upright portions of stud 2 are provided with receiving apertures for supporting a journal or pivot pin 3. A locking bar comprising a tubular member 4 having each end enclosed by caps 5 and 6, is pivotally carried on pivot pin 3. In the embodiment shown, stud 2 comprises a U-shaped member having its closed end attached to base plate 1; however, as will be understood by those versed in the art, the stud may be a solid member having its upper end slotted to provide a receiving opening for the locking bar and pivot pin. A helical coil compression spring 7 is carried within a hollow portion of tubular member 4 and is restrained at one end by cap 6 and at the opposite end by compression disc 8 (as shown in FIGURE 3). Tubular member 4 is provided with a transverse slot 9 which extends from the center of member 4 to a point near one end thereof. Pivot pin 3 extends through slot 9. Spring 7 normally maintains member 4 in the position shown in FIGURE 1; however, a slight pull on the end of the member carrying cap 5, will cause the locking bar to slide in a direction which will compress spring 7. This action will reduce the effective length of one end of the locking bar, relative to the pivotal axis, and extend the opposite end by a corresponding amount. The effective shortening of one end will facilitate passage through the cuff and, at the same time, the effective lengthening of the other end of the locking bar will provide a greater area to grasp the device and will also provide leverage to restore the locking bar to its normal position.

The steps of inserting the cuff link through the receiving openings in a cuff are as follows: first the locking bar is rotated to a vertical position as shown in solid outline in FIGURE 2. The locking bar and stud 2 are inserted through openings 11' and 12' in fabric layers 11 and 12, comprising the cuff. Thereafter, tubular member 4 is grasped between the fingers and pulled upward to the position shown in broken outline at 4A, while stud 2 and base plate 1 are retained in their original positions. This will result in the compression of spring 7 and the pivotal axis of the locking bar, relative to pin 3 will shift toward the end carrying cap 6. Thereafter, the locking bar may be rotated through a quarter turn, and released at the position shown in broken outline at 4B. Upon releasing the locking bar, spring 7 will restore tubular member 4 to its normal position in which the pivotal axis coincides with the longitudinal center of member 4.

Disc 8, placed between spring 7 and pin 3, serves only to provide firm seating of the spring and to result in smooth rotary movement of the locking bar. If desired, however, disc 8 may be omitted, in which instance one end of spring 7 would bear directly against pin 3.

Figure 2:
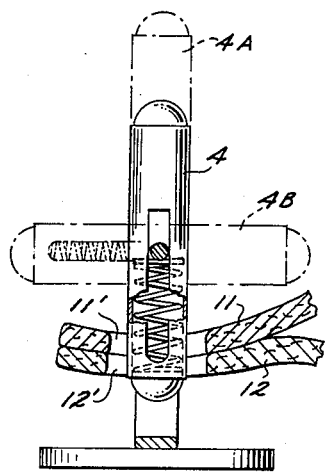
FIGURE 2 is an elevation view, partially in section, illustrating the sequence of operation employed in attaching the device to a cuff.

Although the cuff shown in FIGURE 2 consists of only two layers of fabric (11 and 12) it should be understood that a greater number of layers may be used, the two-layer cuff being illustrated by way of example only.

To provide smooth rotation of the locking bar and to prevent side play, opposite sides of tubular member 4 may be provided with flats 10 and 13 which extend from the pivotal end of slot 9 to just beyond edge of stud 2; that is, the longitudinal dimension of flats 10 and 13 is slightly greater than one-half the width of stud 2.

No detenting action of the locking bar is employed in the embodiment shown since the novel structure of the present invention permits using a locking bar of sufficient length as to obviate accidental disengagement of the cuff link from the cuff. Thus, the locking bar may float on the cuff rather than being positively held in a plane parallel to the plane of the base plate. However, in a typical construction of the present invention, sufficient frictional force exists between bearing surfaces as to prevent completely unrestrained turning movement of the locking bar about its pivotal axis. This characteristic is augmented by the force of spring 7 acting against disc 8 and/or pin 3.

It should be understood that tubular member 4 need not be hollow throughout its entire length, although this embodiment may be most economical to manufacture. As will be apparent to those skilled in the art, the end half of member 4 carrying cap 5 may be made having a solid cross section, in which instance cap 5 may be an integrally formed portion of member 4 rather than a separate element.

Figure 5:
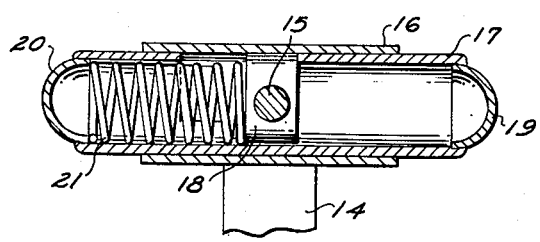
FIGURE 5 is a longitudinal section view of a modification of the locking bar portion of the apparatus.

There is shown in FIGURE 5 an alternate embodiment of the invention in which the locking bar is slidably disposed within a pivotal sleeve which encloses the longitudinal slot in said locking bar, thereby enhancing the outward appearance of the device. Looking now at FIGURE 5, the locking bar comprises a tubular sleeve 16 pivotally carried on pivot pin 15. Pin 15 passes through aperture 16' in sleeve 16 and thence through a coaxially aligned aperture in disc 18. Stanchion or stud 14 supports pin 15. Disc 18 is journaled on pin 15 and serves as a seat for helical spring 21. Tube 17 is slidably supported within sleeve 16 and has its outer ends enclosed by caps 19 and 20. The outer end of spring 21 bears against one end of tube 17 and is restrained at the opposite end by disc 18. A section of tube 17 is partially cut away, as is shown in the exploded view of FIGURE 6, so that it may be longitudinally displaced, within sleeve 16, relative to pin 15 and disc 18.

Figure 6:
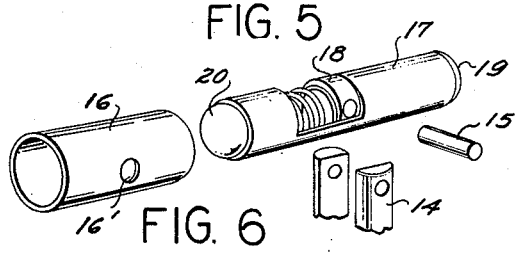
FIGURE 6 is an exploded view of the apparatus of FIGURE 5.

Operation of the embodiment of FIGURES 5 and 6 is similar to that described in FIGURE 2 except that sleeve 16 remains stationary while tube 17 is longitudinally displaced.

Other modifications will be apparent to those versed in the art. While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. A cuff link comprising:
a substantially planar base member,
a U-shaped member extending from said base member,
a pivot pin of circular cross section carried by said U-shaped member opposite said base member and having its major axis parallel with the plane of said base member,
locking bar means having a transverse slot of uniform width therethrough receiving said pivot pin, one end of said slot being at substantially the center of said bar means and the other end of said slot being located adjacent one end of said bar means,
said pin extending through said slot whereby said locking bar is slidably and pivotally supported, and
compression spring restoring means having one end engaging said pivot pin and the other end engaging said one end of said bar means to continually bias said bar means in a direction to engage said one end of said slot with said pivot pin for normally positioning the longitudinal center of said bar to a position coincident with the pivotal axis of said pin, the upright arm portions of said U-shaped member carrying said pin therebetween and the closed end of said U-shaped member being attached to said base member, and said upright arm portions having a length equal to more than one half of the length of said locking bar means thereby permitting said bar means to rotate through a complete revolution when in said normal position.

2. A cuff link comprising:
a base member;
stud means having two parallel legs extending substantially transversely from said base member;
a pivot pin extending transversely between said legs;
locking bar means having a slot and an internal cavity therein, coextensive with said slot receiving said pivot pin, one end of said slot being at substantially the center of said bar means and the other end of said slot being located adjacent one end of said bar means, said bar means being in its normal condition when one end of said slot is biased against said pivot pin and is fully rotatable through said parallel legs through a complete revolution; and
compression spring means located in said cavity and having one end engaging said pivot pin and the other end engaging said one end of said bar means to continually bias said bar means in a direction to engage said one end of said slot with said pivot pin, said bar means being movable relative to said pivot pin and against the force of said compression spring to bodily move said bar means away from said base member and provide substantial clearance therebetween to facilitate rotation of said bar member after insertion thereof through the openings in a cuff.

References Cited in the file of this patent
UNITED STATES PATENTS

| 976,016 | Ward | Nov. 15, 1910 |
| 2,461,845 | Osterberg | Feb. 15, 1949 |

FOREIGN PATENTS

| 475,279 | Great Britain | Nov. 17, 1937 |
| 620,539 | Great Britain | Mar. 25, 1949 |